United States Patent
Liang

(10) Patent No.: US 8,687,312 B1
(45) Date of Patent: Apr. 1, 2014

(54) EDGE DETECTION FOR DISK DRIVES

(75) Inventor: Jiangang Liang, San Jose, CA (US)

(73) Assignee: Western Digital Technologies, Inc., Irvine, CA (US)

(*) Notice: Subject to any disclaimer, the term of this patent is extended or adjusted under 35 U.S.C. 154(b) by 479 days.

(21) Appl. No.: 12/957,152

(22) Filed: Nov. 30, 2010

(51) Int. Cl.
G11B 21/02 (2006.01)
G11B 27/36 (2006.01)

(52) U.S. Cl.
USPC .............................. 360/75; 360/31

(58) Field of Classification Search
None
See application file for complete search history.

(56) References Cited

U.S. PATENT DOCUMENTS

| | | | |
|---|---|---|---|
| 4,321,517 A | 3/1982 | Touchton et al. | |
| 4,691,152 A | 9/1987 | Ell et al. | |
| 5,384,675 A | 1/1995 | Crawforth et al. | |
| 5,455,723 A | 10/1995 | Boutaghou et al. | |
| 5,559,648 A | 9/1996 | Hunter et al. | |
| 5,663,846 A | 9/1997 | Masuoka et al. | |
| 5,781,363 A | 7/1998 | Rowan et al. | |
| 5,963,393 A | 10/1999 | Rowan et al. | |
| 6,563,660 B1 | 5/2003 | Hirano et al. | |
| 6,590,732 B2 | 7/2003 | Kitagawa et al. | |
| 6,636,377 B1 | 10/2003 | Yu et al. | |
| 6,643,088 B1 | 11/2003 | Kawachi | |
| 6,721,121 B1 | 4/2004 | Schreck et al. | |
| 6,754,027 B2 | 6/2004 | Hirano et al. | |
| 6,826,007 B1 | 11/2004 | Patton, III | |
| 6,917,489 B2 | 7/2005 | Lee | |
| 6,920,007 B2 | 7/2005 | Tominaga et al. | |
| 6,977,791 B2 | 12/2005 | Zhu et al. | |
| 7,019,932 B2 | 3/2006 | Hirano et al. | |
| 7,031,093 B2 | 4/2006 | Suzuki | |
| 7,046,474 B2 | 5/2006 | Kuramoto et al. | |
| 7,046,475 B2 | 5/2006 | Hosokawa | |
| 7,068,459 B1 | 6/2006 | Cloke et al. | |
| 7,088,533 B1 | 8/2006 | Shepherd et al. | |
| 7,177,111 B2 | 2/2007 | Gururangan et al. | |
| 7,212,371 B2 | 5/2007 | Abe et al. | |
| 7,274,527 B2 | 9/2007 | Calfee et al. | |
| 7,391,586 B2 | 6/2008 | Keast | |
| 7,486,466 B2 | 2/2009 | Hara et al. | |
| 7,656,605 B1 * | 2/2010 | Sutardja | 360/77.04 |
| 7,869,155 B1 | 1/2011 | Wong | |
| 8,315,005 B1 | 11/2012 | Zou et al. | |
| 2002/0181139 A1 | 12/2002 | Weiehelt et al. | |
| 2004/0047066 A1 * | 3/2004 | Shigematsu | 360/77.04 |
| 2005/0152060 A1 | 7/2005 | Gururangan et al. | |
| 2005/0280916 A1 | 12/2005 | Calfee et al. | |
| 2006/0005403 A1 | 1/2006 | Calfee et al. | |
| 2007/0076317 A1 | 4/2007 | Keast | |

OTHER PUBLICATIONS www.microesys.com/dataStorage/specifications.html.
http://www.microesys.com/pdf/pa2000.pdf, "PA 2000 High Performance Positioning System for Servotrack Writers", MicroE Systems, PA2000 Rev.S1, 2 pages.
www.microesys.com/dataStorage/specifications.html, Jun. 7, 2007.

* cited by examiner

Primary Examiner — Regina N Holder

(57) ABSTRACT

A process is disclosed for determining one or more edges of usable portions of a disk drive. Such knowledge can be used to determine the range of valid tracks of the disk and improve utilization of available disk space. The process can detect the edges by processing one or more disk controller signals, such as an adaptive feed-forward (AFC) injection signal, or a position error signal (PES).

17 Claims, 4 Drawing Sheets

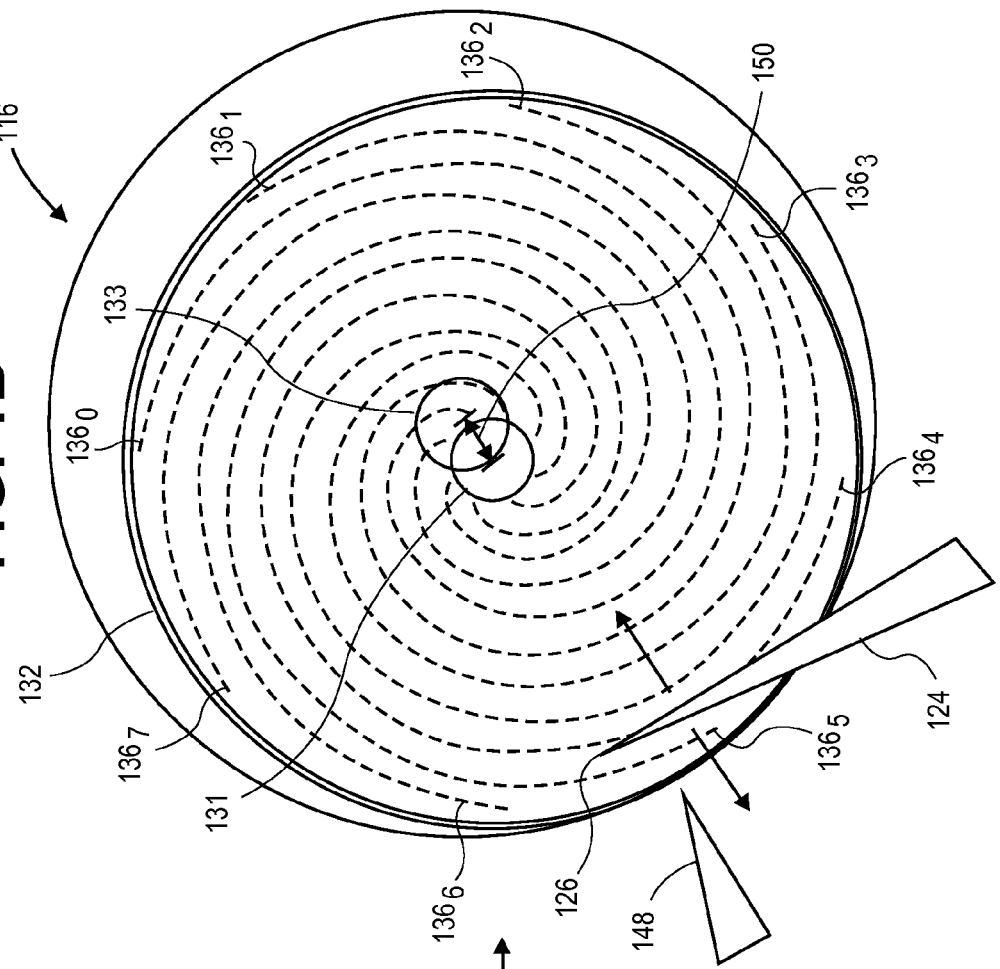
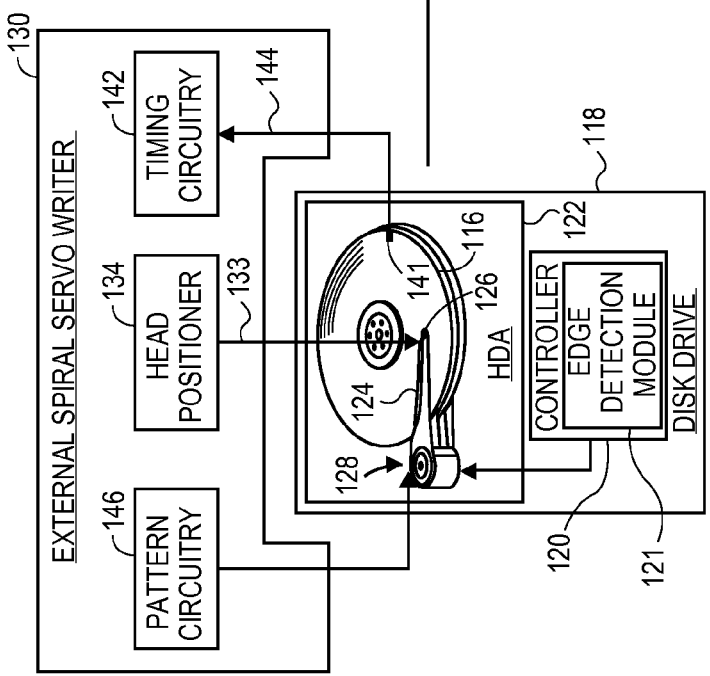

EDGE DETECTION FOR DISK DRIVES

BACKGROUND

1. Technical Field

This disclosure relates to disk drives. More particularly, this disclosure relates to edge detection techniques usable in some embodiments to determine the valid track range of one or more disks of a disk drive.

2. Description of the Related Art

During manufacturing of a disk drive, servo sectors are typically written to a disk to define a plurality of evenly-spaced, concentric tracks. Servo writers are typically used to write the servo sectors to the disk during disk drive manufacturing. Servo writers often employ extremely accurate head positioning mechanics, such as laser interferometers or optical encoders, to ensure that the servo sectors are written at the proper radial location, typically, from the inner diameter of the disk to the outer diameter of the disk. In addition, extremely accurate clocking systems may be utilized in order to write the servo sectors in the proper circumferential locations on the disk. Alternatively, instead of utilizing a servo writer, disk drives may perform self servo-writing in which the disk drive itself writes the servo sectors to the disk.

However, due to variability in the manufacturing process, the range of usable disk space between the inner diameter (ID) and the outer diameter (OD) of disk drives can vary.

BRIEF DESCRIPTION OF THE DRAWINGS

FIG. 1A shows an example disk drive that implements edge detection according to an embodiment.

FIG. 1B shows an enlarged view of an example disk of the disk drive of FIG. 1A incorporating eccentrically arranged spiral reference patterns.

DETAILED DESCRIPTION OF SPECIFIC EMBODIMENTS

Figure 2:
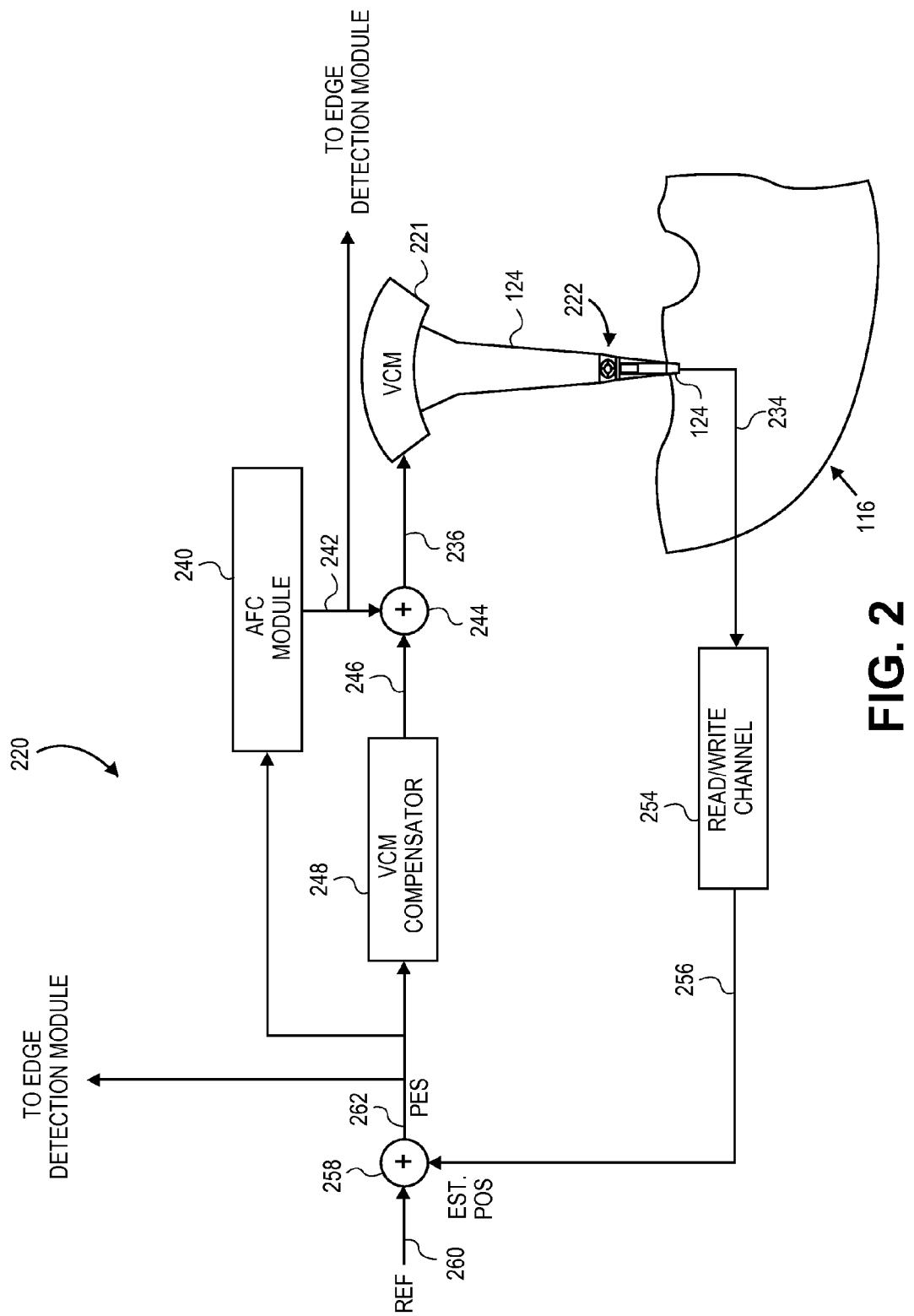
FIG. 2 illustrates one implementation of a portion of the controller of FIG. 1A.

Embodiments described herein include systems and methods for determining one or more edges of usable portions of a disk drive. Such knowledge can be used to determine a range of usable space (e.g., valid tracks) of the disk, thereby improving utilization of available disk space. Specific embodiments of systems and processes will now be described with reference to the drawings. This description is intended to illustrate specific embodiments of the inventions, and is not intended to be limiting. Thus, nothing in this description is intended to imply that any particular component, step or characteristic is essential. The inventions are defined only by the claims.

System Overview

FIG. 1A shows an example disk drive 118 coupled to an external servo writer 130 usable for writing spiral reference patterns $136_0$-$136_7$ (FIG. 1B) to a disk 116 of the drive 118. The spiral reference patterns (servo spiral seeds) may include reference servo bursts that can be used for forming product servo bursts. The disk drive 118 includes controller 120 having an edge detection module 121, and a head disk assembly (HDA) 122. The HDA comprises the disk 116, an actuator arm 124, a head 126 connected to a distal end of the actuator arm 124, and a voice coil motor 128 for rotating the actuator arm 124 about a pivot to position the head 126 radially over the disk 116. The external spiral servo writer 130 may be used to control a radial location of the head 126 for writing a plurality of the spiral reference patterns $136_0$-$136_7$ between an inner radial location 131 and an outer radial location 132 on the disk 116. While only one disk 116 is shown in FIG. 1B, the drive 118 may include a platter of disks 116 arranged in a vertical stack as shown in FIG. 1A.

A head positioning pin 133 of the external spiral servo writer 130 may be inserted into the HDA 122 before writing the spiral reference patterns. The head positioning pin 133 may be used for engaging the actuator arm 124. The external spiral servo writer 130 includes head positioning mechanics 134 used to derive a radial location of the head 126. The head positioning pin 133 is actuated in response to the radial location of the head 126 in a closed loop system in order to position the head 126 radially over the disk 116 while writing a plurality of reference servo bursts to the disk along a plurality of substantially spiral paths to form the plurality of spiral reference patterns $136_0$-$136_7$ as illustrated in FIG. 1B.

According to certain embodiments, the drive 118 further includes a ramp 148 and a crash stop (not shown). The ramp 148 is positioned near the outer diameter of the disk and configured to load and unload the head 126 to and from the disk 116. The crash stop (not shown) can include a structure positioned near the center of the disk generally configured to limit movement of the head near the inner diameter of the disk. As is described in greater detail below, in certain embodiments the edge detection module 121 of the controller 120 implements a process to determine one or more edges of a usable region of the disk drive by detecting interaction of the recording head 126 with the ramp 148 and/or crash stop.

As shown, due to variations in the assembly process, the patterns 136 may be off-center with respect to the center of rotation 133 of the disk 116. For example, when the disk(s) 116 is installed in the drive, it may be mounted such that the pre-written spirals are off-center with respect to the drive spindle. Thus, a corresponding eccentricity 150 is associated with the disk 116. Where such eccentricity 150 exists, the controller 120 can be configured to counteract the eccentricity 159 during drive operation. For example, adaptive feed-forward control (AFC) can be implemented by the controller 120 to counteract eccentricity and/or provide other error correction. In some cases, the controller implements AFC by introducing repetitive motion (e.g., back and forth motion, oscillatory motion, periodic motion, and/or motion otherwise including significant frequency content) into the drive head trajectory that causes the drive head to follow the eccentrically written tracks during disk rotation.

FIG. 2 shows a portion 220 of an example disk drive controller in accordance with some embodiments. For example, the embodiment shown in FIG. 2 may form a portion of the controller 120 of the disk drive 118 of FIG. 1. The controller 220 processes a read signal 234 to generate a position error signal (PES) 262. The PES 262 can be filtered with a suitable compensation filter to generate a control signal 236 applied to a voice coil motor (VCM) 221, which rotates an actuator arm 124 about a pivot in order to position the head 126 radially over the disk 116 in a direction that reduces the PES. A microactuator (not shown, e.g., a piezoelectric actuator) may also be incorporated in some embodiments in combination with the VCM 220 to improve tracking performance.

The AFC module 240 produces an AFC injection signal 242. The AFC injection signal 242 is combined 244 with a VCM control signal 246 generated by a VCM compensator 248. The estimated position 256 is compared 258 to a reference position 60 to generate the PES 262. The AFC module 240 processes the PES 262 to adapt the coefficients of the AFC injection signal 242. The PES 262 is also processed by the VCM compensator 248 to generate the VCM control signal 246. The controller 220 combines the output 246 of the VCM compensator 248 with the AFC injection signal 242 to generate the VCM control signal 246.

Edge Detection

Referring now to both FIGS. 1 and 2, interaction of the recording head 126 with one or more of the ramp 148 and crash stop causes a disturbance in the repeatable motion of the head 126, and a corresponding change in the AFC injection signal 242. In certain embodiments, the edge detection module 121 can be configured to detect such disturbances to identify edges of usable portions the disk.

As will be described in greater detail below, the edge detection process according to some aspects involves performing a frequency transform on values of a signal in the control path of the disk drive 118. Moreover, as part of the edge detection process, the edge detection module 121 may determine a deviation in a repetitive motion (e.g., back and forth motion, oscillatory motion, periodic motion, and/or motion otherwise including significant frequency content) of the head 126, where the deviation is caused by interaction between the head 126 and the ramp 148 and/or crash stop (or other appropriate motion-limiting structure).

In comparison to some techniques, the edge detection process advantageously allows for relatively precise and robust detection of head interaction with the ramp 148 and/or crash stop. Moreover, because of the improved precision and reliability of the process, edge detection techniques described herein involve relatively low risk of damage to drive components during the detection process. Thus, the drive 118 can employ such techniques to safely and accurately determine valid track range or otherwise determine the boundaries of usable drive space. Moreover, because the edge detection processes described herein can in some cases be implemented in firmware with little or no added hardware, they can be incorporated at minimal cost.

While a variety of implementations are possible, the edge detection process will now be described with respect to an illustrative example for the purposes of illustration. The example is described with respect to a scenario where the edge detection module 121 detects an outer edge of a usable region of the disk based on interaction between the head 128 and the ramp 148. It will be appreciated that the process can be used to detect an inner edge based on interaction between the head 126 and the crash stop. Moreover, in some cases, the edge detection module 121 detects interaction between some other portion of the arm 124 instead of, or in addition to, the recording head 126.

In the example implementation, the edge detection module 121 processes the AFC signal 242 to detect the ramp and/or crash stop disturbance. Other signals can be used instead of or in addition to the AFC signal 242. For example, as will be described below, the PES signal 262 can be used.

Still referring to FIGS. 1 and 2, as described, the AFC module 242 can be configured to inject the AFC signal 242 (e.g., a sinusoidal or other or substantially periodic signal) into the VCM control path to cause the head 126 to move according to a predetermined, repetitive trajectory so as to counteract the eccentricity of the disk 116. However, interaction between the head 126 and the ramp 148 will result in a relatively low frequency disturbance in the repetitive motion, and the AFC module 240 is configured to adaptively adjust to (learn) such changes in head 126 trajectory. Thus, as the head 126 begins to interact with the ramp 148, the values of the AFC signal 242 will exhibit a corresponding deviation. In the example implementation, the edge detection module 121 is configured to detect this deviation by comparing values derived from the AFC signal 242 with an established threshold.

To generate the values used in the comparison and in determining the threshold, the edge detection module 121 performs a single frequency discrete Fourier transform (DFT) on values of the AFC signal 242 and analyzes the magnitudes of the DFT values, although a variety of other operations are possible. For example, other types of frequency transforms or other appropriate mathematical operations may be implemented. In some embodiments, the phase of a frequency transform (e.g., DFT) operation is used instead of, or in combination with the magnitude. In another alternative implementation, a cross-correlation operation is employed. In an example of such a configuration, a threshold cross-correlation is established by calculating the cross-correlation between sets of signal values (e.g., PES or AFC signal values corresponding to one or more revolutions) taken at a plurality of locations spaced from the edge of the disk 116. These sets of signal values taken away from the edge are likely to have a relatively high correlation. As the head 126 is actuated towards the edge of the disk 118, the cross-correlation is iteratively performed and will drop below the established threshold upon sufficient interaction between the head 126 and the ramp 148 or crash-stop. Moreover, while the example disk drive 116 implements adaptive feed-forward control, other types of control schemes are compatible with embodiments described in the disclosure, such as feed-back or non-adaptive control algorithms.

In order to establish the threshold, the detection module 121 processes values the AFC signal 242 for values corresponding to head 126 positions spaced from the ramp 148. Thus, the threshold is established while there is no significant interaction between the head 126 and the ramp 148. In the example, the average of a number of DFT samples corresponding to one revolution of the disk is calculated, and the threshold is set at three times the calculated average.

A variety of other algorithms are possible for the threshold determination. For example, the threshold may be determined using more or less samples or a higher or lower threshold (e.g., 1, 2, 4, 5, 10 or more times the calculated average), a standard deviation or other appropriate operation can be used, etc. In some cases, a maximum or minimum value may be used instead of an average. Moreover, in some embodiments, a sliding window threshold is implemented. In such a configuration, the threshold is iteratively recalculated based on a predetermined number of samples in the window (e.g., the previous 10 or 20 samples) as the head 126 moves towards the ramp 148 (or crash stop).

Figure 3:
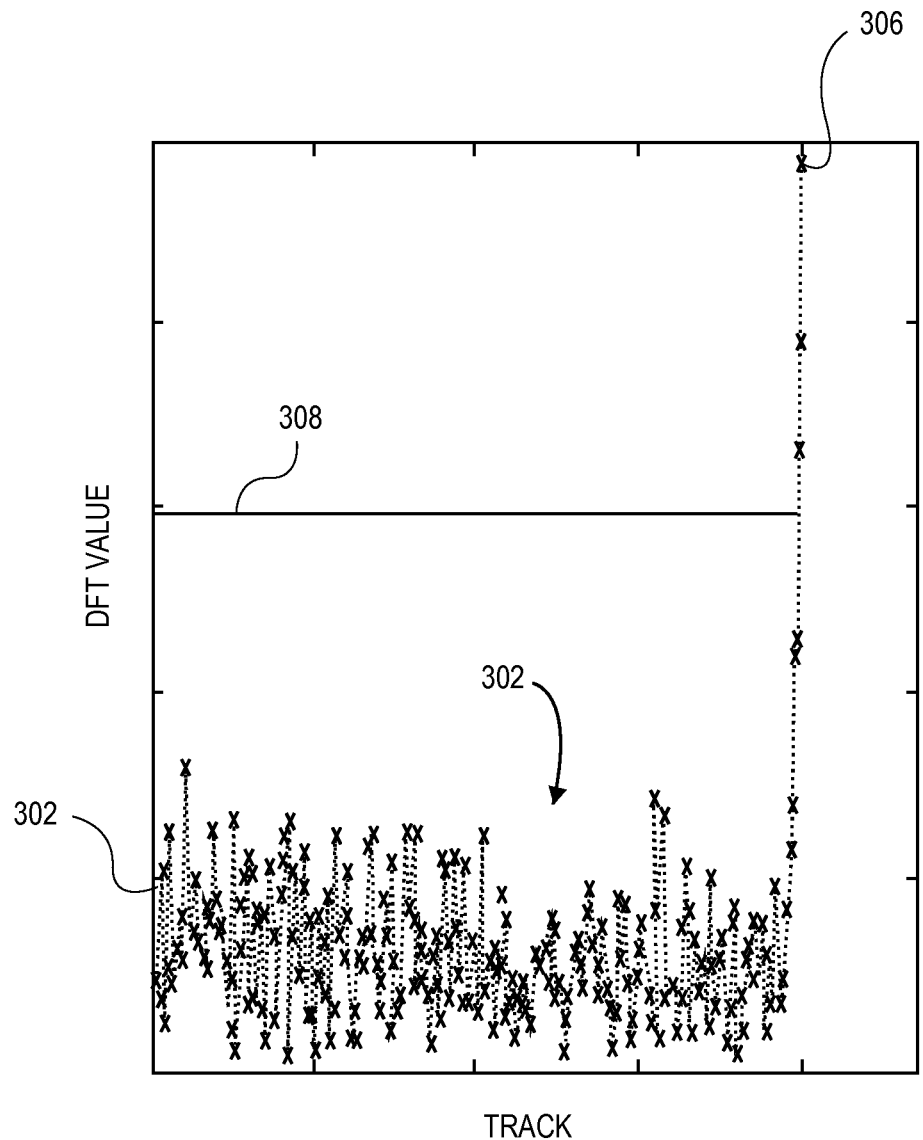
FIG. 3 illustrates a plot showing example data samples used in an edge detection process according to an embodiment.

Once the head 126 is moved sufficiently close to the ramp 148 to trigger the threshold condition, the edge detection module 121 determines and records the position of the outer edge of the disk 116. FIG. 3 illustrates a plot 300 showing DFT values 302 processed by an edge detection module 121 in accordance with certain embodiments. In the example plot, each DFT values 302 corresponds to one or more head 126 positions (e.g., tracks), and extend from the leftmost DFT value 304 corresponding to a head 126 position farthest from the ramp 148 to the rightmost DFT value 306 corresponding to a head 126 position nearest the ramp 148. As shown, once the head 126 reaches a position sufficiently close to the ramp 148, the DFT values 302 exceed the established threshold 308 due to the ramp 148/head 126 interference.

A variety of algorithms are possible for determining the edge of the usable portion of the disk 116. For example, the edge of the disk 116 may correspond to the current head 126 position which resulted in the threshold condition being triggered. In another embodiment, the edge of the disk 116 corresponds to a position on the disk 116 that is spaced a predetermined radial distance away from the current head 126 position (e.g., towards the center of the disk 116), thereby providing greater margin between the ramp 148 and the edge.

In one embodiment, the margin is 100 tracks from the head position corresponding to the threshold trigger condition, although other values are possible (e.g., 5, 10, 50, 200, 500, 1000 or more tracks).

The edge detection module 121 detects and records the position of the inner edge of the disk 116 in a similar fashion but by moving the head 126 towards the center of the disk 116 to detect interaction between the head 126 and the crash stop. Once both edges are established, the controller 120 can calculate a valid track range by calculating the number of tracks between the first edge and the second edge, or by performing some other appropriate calculation.

The AFC injection module 240 can be configured to adapt to select frequency content of interfering signals. For example, the AFC module 240 adapts to portions of interfering signals corresponding to particular harmonics (referred to herein as "AFC harmonics"), e.g., low order harmonics, of a selected fundamental frequency. Moreover, the edge detection module 121 may advantageously utilize knowledge of what the AFC harmonics are in the edge detection process. For example, the edge detection module 121 may use DFT values (e.g., DFT power values) corresponding to this frequency content or a subset thereof. Although a wide variety of algorithms are possible, in the example embodiment, the AFC module 240 adapts to frequency content corresponding to the 1st and 2nd harmonics of a selected fundamental frequency, and the edge detection module 121 uses DFT values corresponding to the 2nd harmonic in the edge detection process. In one embodiment, the fundamental frequency is equal to or derived from the frequency of disk 116 rotation. For example, the fundamental frequency may be equal to the number of revolutions of the disk 116 per second. In other cases, the fundamental frequency may be equal to a multiple of the disk rotation frequency (e.g., ¼, ½, 2, 4, 8 or 10 times the disk rotation frequency).

As discussed, other signals can be used in the edge detection process. For example, in some configurations, the PES signal 262 is used. A frequency transform (e.g., DFT) other operation can be performed on the PES signal 262 in a manner similar to the above example where the AFC signal 242 is used. For example, a single DFT can be performed on the PES signal 262 to detect head 126/ramp 148 and/or head 126/crash stop interaction.

As discussed, where an AFC module 240 is employed, the AFC module 240 will adaptively counteract disturbances in recording head 126 motion corresponding to certain frequency components, e.g., AFC harmonics. Thus, interfering signal (e.g., due to ramp and/or crash stop interaction) corresponding to these frequency components will not propagate at significant levels to the PES signal 262 via the read signal 234. As such, where an AFC module 240 is present and the PES signal 262 is used in the edge detection process, the edge detection module 121 can utilize PES signal 262 DFT values corresponding to frequency components included in the interfering signal but not accounted for by the AFC module 240 (e.g., non-AFC harmonics). For example, in one embodiment where the AFC-harmonics are the 1st and 2nd harmonics of a particular fundamental frequency, the edge detection module 121 uses PES signal 262 DFT values corresponding to one or more of the 3rd and 4th harmonics in the edge detection process. In other embodiments, different frequency content (e.g., non-AFC harmonics) may be used.

Figure 4:
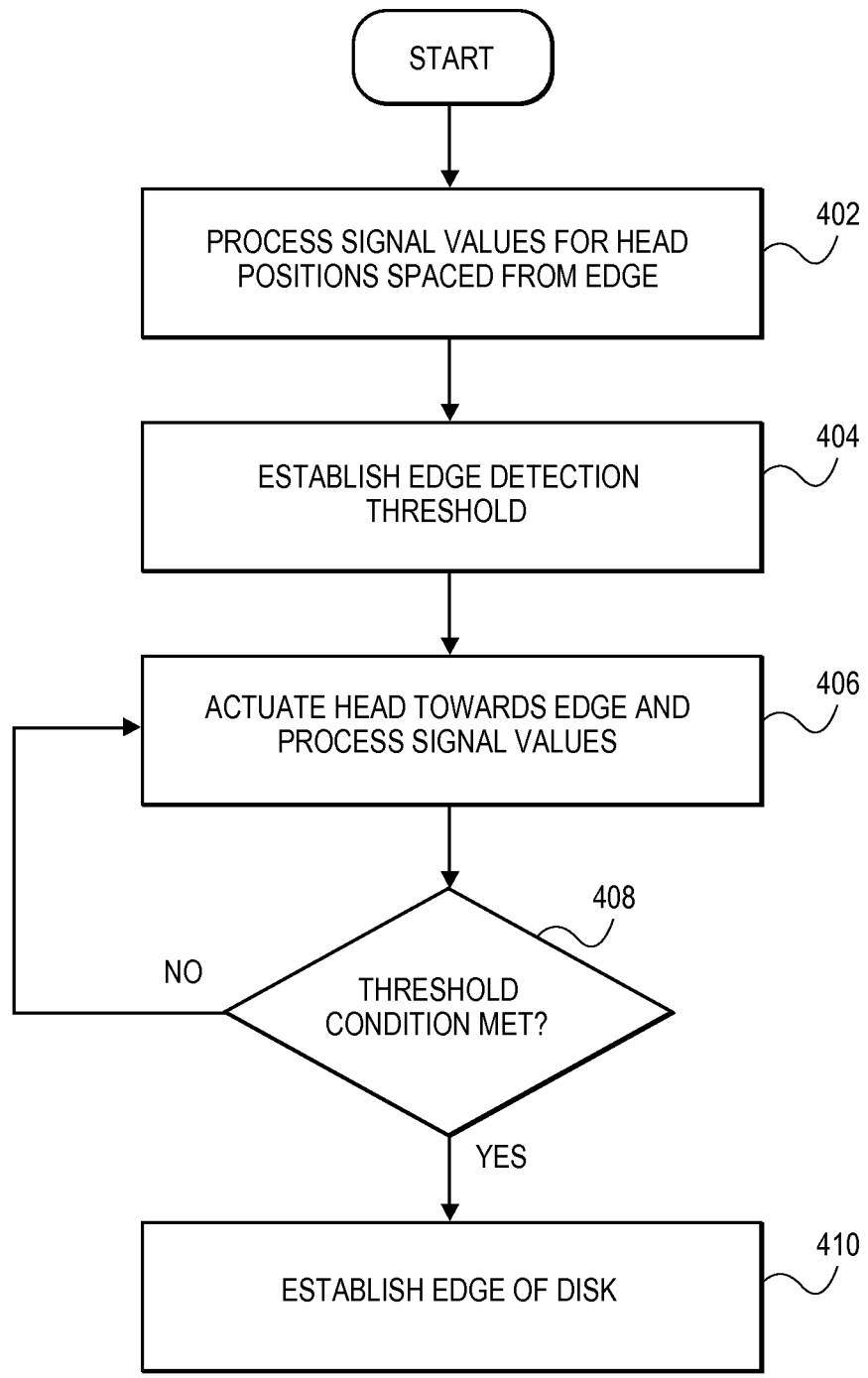
FIG. 4 illustrates an example process for performing edge detection.

FIG. 4 illustrates an embodiment of an example process for detecting an edge of a usable region of a disk 116 of a disk drive 118. At block 402, the process processes signal values for head 126 positions spaced from an edge of the disk 116. The head 126 may be positioned in a region generally between the inner and outer diameters of the disk 116, for example, or in a region otherwise not in proximity to the edges, ramp 148 and/or crash stop. Moreover, the usable region of the disk 116 may encompass one or more portions of the disk 116 between the ramp 148 and the crash stop. For example, the usable region may include disk portions 116 (e.g., tracks) sufficiently spaced from the ramp 148 and/or crash stop to allow proper operation of the recording head 126 during drive operation.

A variety of signals can be used in the edge detection process. For example, as discussed, the PES signal 262 or the AFC signal 242 may be used. Generally, any signal usable to control actuation and/or determine the position of the recording head 126 with respect to the disk 116 may be used in various configurations. For example, a special reference signal may be generated that is dedicated to the edge detection process, or some other pre-defined control path signal can be used. For example, in some cases, the spiral patterns 136 are not written prior to assembly but are instead written after the disks 116 are assembled in the drive 116, thereby reducing or eliminating eccentricity 150. Thus, unlike the scenario described above, the AFC signal 242 is not pre-configured to cause a repetitive trajectory of the head 126 to counteract the eccentricity 150. Instead, a dedicated signal (e.g., a sinusoidal or other periodic or substantially periodic signal) can be injected into the control path. Such a signal can be added to the PES signal 262 or to the VCM control input 236, for example. The AFC 240 will adapt to the injected signal, causing repetitive motion of the head 126, which can be used as a reference in the edge detection process in the manner described herein.

While the particular operation used in the edge detection process can vary, in some embodiments, such as in the example described above, the edge detection module 121 performs a frequency transform (e.g., DFT) on signal values corresponding to head 126 positions spaced from the disk edge. At block 404, the process establishes the edge detection threshold. For example, as described above, the edge detection module 121 processes one or more of the transformed signal values according to a desired algorithm to generate the threshold.

As described, the selected algorithm used in the threshold determination can vary. As a few illustrative examples, the edge detection module 121 may calculate an average, standard deviation, minimum or maximum, derivative, or the like on a select subset (e.g., a fixed or rolling window) of signal values to determine the threshold at block 404.

At block 406, process continues to actuate the head 126 towards the edge of the disk 116 and continues to process signal values according to the selected algorithm, e.g., by performing a frequency transform on the signal values. The edge detection module 121 compares the current signal values to the threshold condition to determine whether the threshold condition has been met.

At block 408, the process can also include determining an edge of the usable region of the disk 116 in response to the threshold condition being satisfied. For example, the first edge may be an inner edge of the disk determined by detecting interaction of the recording head with a crash stop of the disk drive. As described, the edge detection module 121 may establish the edge at the current head 126 position, corresponding the threshold condition being satisfied, may be spaced from the current head 126 position by a predetermined margin, such as a number of tracks, or may be determined according to some other appropriate scheme.

As will be appreciated, after establishing a first edge, the process can generally repeat to determine another edge of the disk. The second edge may be an outer edge of the disk, for example, determined by detecting interaction of the disk with a ramp 148. In other compatible embodiments, structures other than a crash stop and/or ramp 148 may be used to delineate the inner and outer edges, respectively. As discussed above, the process can additionally include calculating a valid track range at least in part based on the first edge and the second edge. For example, the valid track range may include some or all of an annular region of the disk between the first edge and the second edge.

The edge detection processes described herein may be implemented in firmware code executed by the controller 120; in application-specific circuitry of the controller 120; or a combination thereof. If implemented partly or wholly in firmware or other executable code, the executable code may be stored in any appropriate type of non-transitory computer readable medium, such as a solid state memory device.

Additionally, the features and attributes of the specific embodiments disclosed above may be combined in different ways to form additional embodiments, all of which fall within the scope of the present disclosure. Although certain embodiments have been disclosed, other embodiments that are apparent to those of ordinary skill in the art, including embodiments which do not provide all of the features and advantages set forth herein, are also within the scope of this disclosure. Accordingly, the scope of protection is defined only by the claims.

What is claimed is:

1. A method of detecting an edge of a usable region of a disk of a disk drive, the method comprising:
   generating an adaptive control signal to cause a recording head of a disk drive to move in a repetitive motion to counteract eccentricity;
   processing a plurality of first values of a signal usable to control actuation of the recording head of the disk drive with respect to a disk of the disk drive, the first values corresponding to recording head positions not in proximity to an edge of a usable region of the disk, the disk comprising a plurality of tracks eccentrically arranged with respect to the center of the disk, and the recording head configured to move in a repetitive motion;
   processing one or more second values of the signal corresponding to recording head positions in proximity to the edge;
   determining an edge detection threshold condition by calculating a cross-correlation between the plurality of first values of the signal; and
   determining a deviation in the repetitive motion of the recording head in response to the processing of the plurality of first values of the signal and the processing of the one or more second values of the signal by processing the one or more second values of the signal to determine whether the threshold condition has been satisfied, the deviation in the repetitive motion indicating that the recording head has reached an edge of the usable region of the disk,
   wherein the method is performed at least in part using a controller of the disk drive.

2. The method of claim 1, wherein the signal is the adaptive control signal.

3. The method of claim 2, wherein processing the second signal values comprises evaluating frequency content that is counteracted by the adaptive control signal.

4. The method of claim 1, further comprising:
   determining a first edge of the usable region of the disk in response to the threshold condition being satisfied due to interaction of the recording head with a crash stop of the disk drive;
   determining a second edge of the usable region of the disk in response to the threshold condition being satisfied due to interaction of the recording head with a ramp of the disk drive; and
   calculating a valid track range at least in part based on the first edge and the second edge.

5. The method of claim 1, wherein the signal is a position error signal.

6. The method of claim 1, wherein the processing the plurality of first values of the signal comprises performing a frequency transform on the plurality of first values of the signal and processing the second signal values comprises performing a frequency transform on the second signal values.

7. The method of claim 6, further comprising:
   evaluating the output of the frequency transform on the plurality of first values of the signal by evaluating frequency content of the frequency transform on the plurality of first values of the signal that is not counteracted by the adaptive control signal; and
   evaluating the output of the frequency transform on the second signal values by evaluating frequency content of the frequency transform on the second signal values that is not counteracted by the adaptive control signal.

8. The method of claim 1, wherein determining the deviation further comprises calculating a correlation between one or more of the plurality of first values of the signal and one or more of the second signal values.

9. A disk drive comprising:
   a disk comprising a plurality of tracks, wherein the plurality of tracks are eccentrically arranged with respect to the center of the disk;
   a recording head actuatable with respect to the disk, the recording head configured to move in a repetitive motion;
   a controller configured to generate a signal usable to control the actuation of the recording head with respect to the disk, the controller further configured to:
   inject an adaptive control signal to cause the recording head to move in the repetitive motion to counteract the eccentricity;
   process a plurality of first values of the signal corresponding to recording head positions not in proximity to an edge of a usable region of the disk;
   process one or more second values of the signal corresponding to recording head positions in proximity to the edge;
   establish an edge detection threshold condition in response to the processing of the plurality of first values of the signal by calculating a cross-correlation between sets of the plurality of first values of the signal;
   determine a deviation in the repetitive motion of the recording head in response to the processing of the plurality of first values of the signal and the processing of the one or more second values of the signal the one or more second values of the signal to determine whether the threshold condition has been satisfied, the deviation in the repetitive motion indicating that the recording head has reached an edge of the usable region of the disk.

10. The disk drive of claim 9, wherein the disk drive further comprises a ramp and a crash stop, and wherein the determined deviation in the repetitive motion of the recording head is indicative of interaction of the recording head with one or more of the ramp and the crash stop.

11. The disk drive of claim 9, wherein the controller is further configured to:
    determine a first edge of the usable region of the disk in response to the threshold condition being satisfied due to interaction of the recording head with a crash stop of the disk drive;
    determine a second edge of the usable region of the disk in response to the threshold condition being satisfied due to interaction of the recording head with a ramp of the disk drive; and
    calculate a valid track range at least in part based on the first edge and the second edge.

12. The disk drive of claim 9, wherein the controller is further configured to process the plurality of first values of the signal by performing a frequency transform on the plurality of first values of the signal and process the second signal values by performing a frequency transform on the second signal values.

13. The disk drive of claim 9, wherein the controller is further configured to determine the deviation in the repetitive motion of the recording head at least in part by calculating a correlation between one or more of the plurality of first values of the signal and one or more of the second signal values.

14. The disk drive of claim 9, wherein the signal is the adaptive control signal.

15. The disk drive of claim 9, wherein the signal is a position error signal.

16. The disk drive of claim 9, wherein the plurality of tracks comprise spiral tracks usable during servo-writing of the disk.

17. A disk drive comprising:
    a disk comprising a plurality of tracks, wherein the plurality of tracks are eccentrically arranged with respect to the center of the disk;
    a head actuatable with respect to the disk, the head configured to move in a repetitive motion; and
    a controller configured to:
        generate an adaptive control signal to cause the head to move in the repetitive motion to counteract the eccentricity;
        establish an edge detection threshold condition by calculating a cross-correlation between a plurality of first values of a signal, the signal comprising at least in part the adaptive control signal; and
    determine a deviation in the repetitive motion of the head by processing one or more second values of the signal to determine whether the threshold condition has been satisfied, the deviation indicating that the recording head has reached an edge of a usable region of the disk.

* * * * *